(12) United States Patent
Guth

(10) Patent No.: US 7,786,407 B2
(45) Date of Patent: Aug. 31, 2010

(54) PROCESS FOR CAPILLARY ELECTRIC WELDING OF LOW AND HIGH ALLOY STEELS, HARDENED OR NOT, AND BIMETALS, FOR THE OBTAINMENT OF A DETERMINED TEXTURE, WITHOUT THERMAL TREATMENT

(76) Inventor: Bela Guth, Av. Manoel Dias da Silva, 2199 APTO. 501., Pituba, Salvador, Bahia (BR)

( * ) Notice: Subject to any disclaimer, the term of this patent is extended or adjusted under 35 U.S.C. 154(b) by 971 days.

(21) Appl. No.: 11/143,199

(22) Filed: Jun. 2, 2005

(65) Prior Publication Data

US 2006/0043084 A1 Mar. 2, 2006

(30) Foreign Application Priority Data

Aug. 31, 2004 (BR) .................................... 0403851

(51) Int. Cl.
*B23K 9/23* (2006.01)
*B23K 35/30* (2006.01)
*B23K 35/36* (2006.01)

(52) U.S. Cl. ......................... 219/137 WM; 219/146.23; 219/146.51

(58) Field of Classification Search ......... 219/137 WM, 219/146.23, 146.51, 146.1; 148/524; 428/683
See application file for complete search history.

(56) References Cited

U.S. PATENT DOCUMENTS 3,194,642 A * 7/1965 Bates et al. .................. 428/637
3,495,069 A * 2/1970 Cavanagh et al. ...... 219/146.41
3,610,876 A * 10/1971 Bhat ....................... 219/137 R
4,196,335 A * 4/1980 Ikeda et al. ..................... 219/73
5,272,315 A * 12/1993 Guth ....................... 219/137 R
6,845,900 B2 * 1/2005 Fairchild et al. ............. 228/165
2002/0043305 A1* 4/2002 Fairchild et al. ............ 148/336
2006/0137777 A1* 6/2006 Ishikawa et al. ............ 148/558

OTHER PUBLICATIONS

ASM Glossary of Metallurgical Terms Handbook pp. 5-6, 13, 30, 46, 52, 67 & 76.*
AWS A5.22-95 American Welding Society Specification for Stainless Steel Electrodes, pp. 29-31.*

* cited by examiner

*Primary Examiner*—M. Alexandra Elve
(74) *Attorney, Agent, or Firm*—B. Aaron Schulman; Stites & Harbison PLLC

(57) ABSTRACT

Patent of Invention for PROCESS CAPILLARY ELECTRIC WELDING OF LOW AND HIGH ALLOY STEELS, HARDENED OR NOT, AND BI-METALS, FOR THE OBTAINMENT OF A DETERMINED TEXTURE, WITHOUT THERMAL TREATMENT, in which the first layer (1) is used to line the bevel and its root with electrodes of crystallization of the deposited welding material, said weld being adequate for the obtainment of the austenitic plus ferretic texture. With the second layer (2), proceed with the filling of the bevel with the crystallization of the deposited weld, obtaining a perlitic or pearlitic plus troostitic texture, while in the third and fifth layers (3, 5), the electrode for the obtainment of an austenitic plus ferritic texture. In the fourth layer (4), the electrode of deposited weld crystallization for the obtainment of a sorbitic plus bainitic texture is used, and in the sixth layer (6), an electrode for deposited weld crystallization for the obtainment of a bainitic texture is used.

7 Claims, 4 Drawing Sheets

PROCESS FOR CAPILLARY ELECTRIC WELDING OF LOW AND HIGH ALLOY STEELS, HARDENED OR NOT, AND BIMETALS, FOR THE OBTAINMENT OF A DETERMINED TEXTURE, WITHOUT THERMAL TREATMENT

FIELD AND BACKGROUND OF THE INVENTION

The present report discusses a process for capillary electric welding of low and high alloy steels, hardened or not, and bimetal, for the obtainment of a determined texture, without thermal treatment As it is known by technicians on the subject, when welding hardened steel, low and high alloy steel, forged steel with high carbon content, bimetallic union (for example, welding of two different metals, such as stainless steel with carbon steel), manganese steel, Hadfield steel and others, a conventional thermal treatment system is necessary before, during and/or after a weld, in order to normalize the undesirable crystallization of the weld applied, martensitic and thick, which is found in the so-called Affected Transition Zone, or Thermally Affected Zone. This thermal treatment significantly increases the cost of the final product.

Furthermore, the size of the piece frequently impedes the thermal treatment and, therefore, the welded part becomes very hard and does not meet the requirements of dynamic strength of the part, resulting in fissures and cracks, sometimes resulting in its breakage. The low temperature welding process used to weld all types of steel, their alloys, bi-metals and, also, cast pieces, presented by this invention, includes the selection of the appropriate crystallization of the welding material deposited, the system of electrode application and the correct use of the deposited weld, with the observance of the temperature of the part during the welding operation, in order to eliminate the undesirable thick martensitic texture and avoid the recrystallization of the Weld Transition Zone, also known as Affected Transition Zone (ATZ).

SUMMARY OF THE INVENTION

The new process of the present invention includes four types of electrodes for the selection of the adequate weld crystallization deposited, such as the austenitic plus ferritic; pearlitic or pearlitic plus troostitic; sorbitic plus bainitic; and bainitic. These electrodes have never been used to weld hardenable steels or Hadfield steel, high carbon steel, high alloy steel and bi-metals, without thermal treatment.

In this way, the mechanical and physical characteristics of the base material are preserved and the deposited weld is machineable which permits that more important mechanical designs be modified for the use of alloy steels of the types SAE 4140, 4330, 4345, among other types of steel.

The present process known as "low temperature welding", eliminates thick martensitic texture and avoids the recrystallization in the Weld Transition Zone, also known as the Affected Transition Zone (ATZ), and eliminates any type of thermal treatment, without hardening the deposited weld and not altering the physical characteristics of the base material, thus permitting the machining of the deposit material, due to the absence of the thick martensitic crystals and, consequently, adequate hardness of the deposited metal.

The invention is described in detail below regarding the preferred manner of execution and shown in the attached drawings.

DETAILED DESCRIPTION OF THE INVENTION

Figure 1:
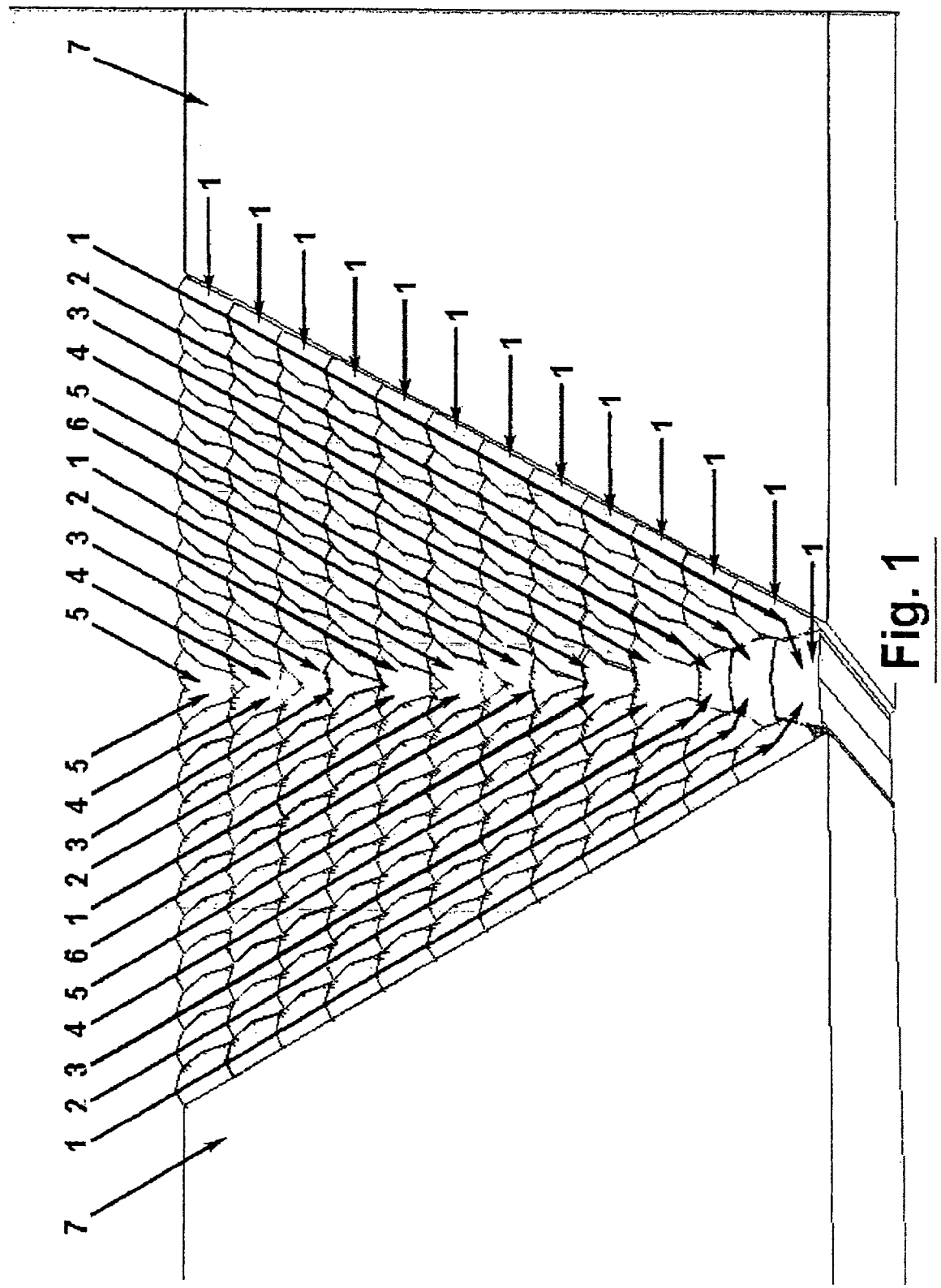
FIG. 1 illustrates a union made in accordance with the proposed invention.
Figure 2:
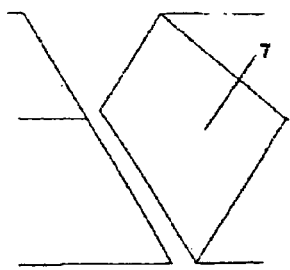
FIGS. 2 to 13 illustrate the different layers of deposit in the bevel.
Figure 3:
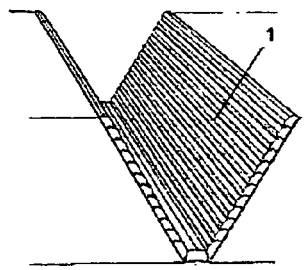
Figure 4:
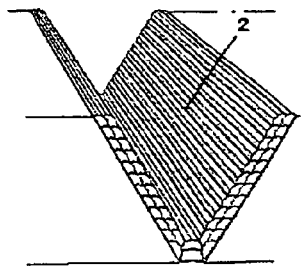
Figure 5:
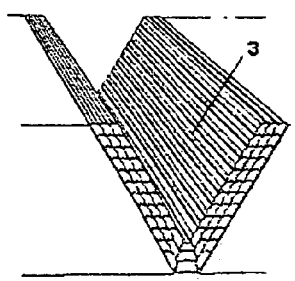
Figure 6:
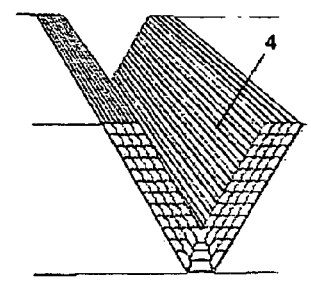
Figure 7:
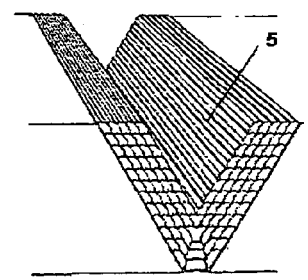
Figure 8:
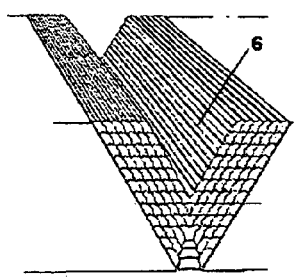
Figure 9:
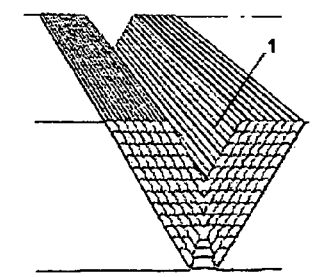
Figure 10:
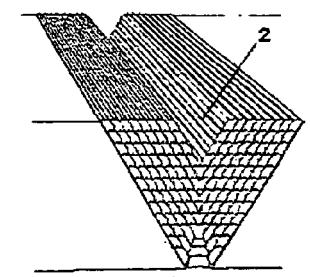
Figure 11:
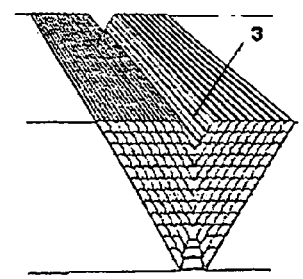
Figure 12:
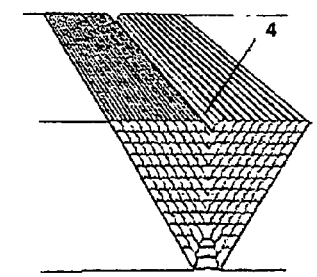
Figure 13:
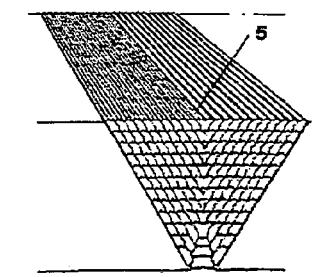
Figure 14:
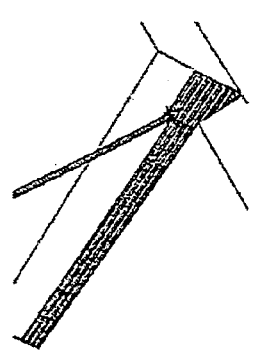
FIGS. 14 to 29 illustrate how the intercalation of the weld beads is executed.
Figure 15:
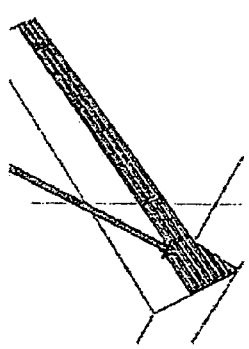
Figure 16:
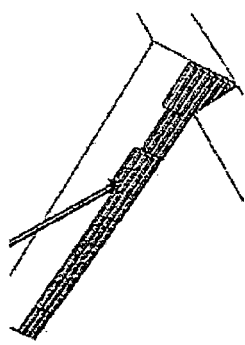
Figure 17:
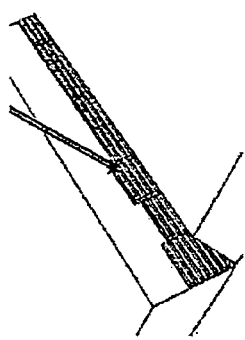
Figure 18:
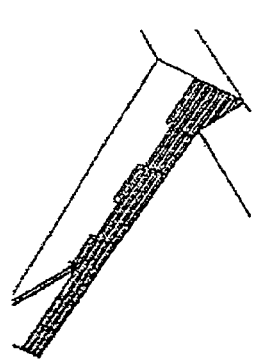
Figure 19:
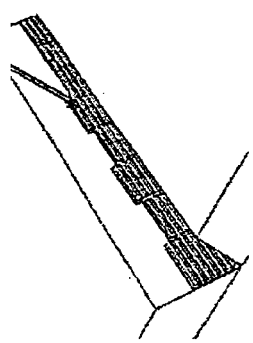
Figure 20:
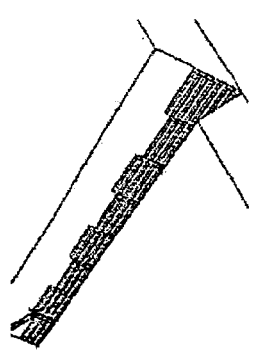
Figure 21:
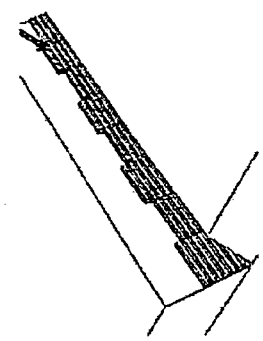
Figure 25:
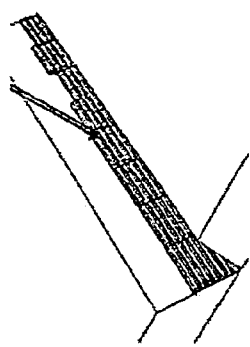
Figure 29:
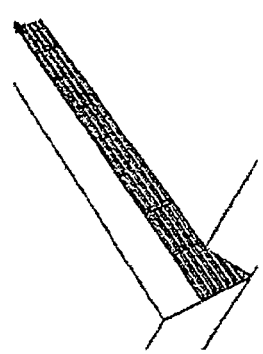
Figure 24:
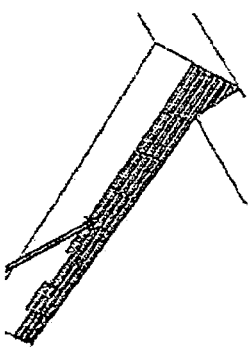
Figure 28:
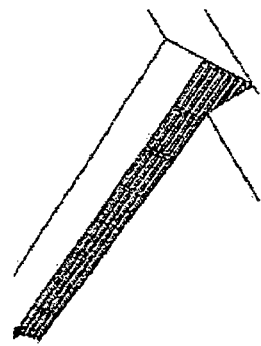
Figure 23:
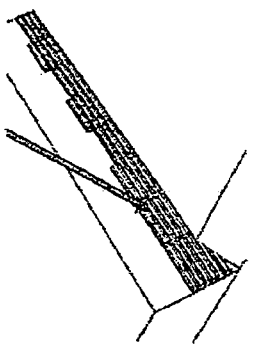
Figure 27:
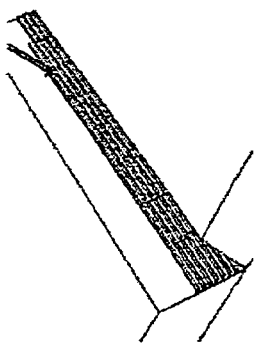
Figure 22:
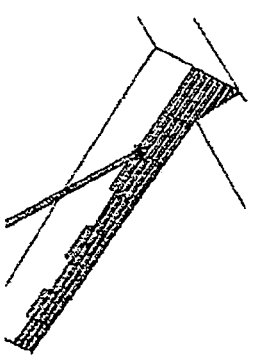
Figure 26:
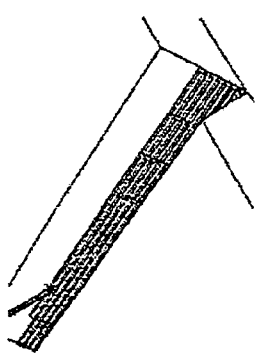

The invention consists in the use of capillary electric welding electrodes with specific characteristics for all types of steel, such as low and high alloys and hardenable or hardened steels, high carbon steel or manganese steel (Hadfield) or SAE 4140 steel, the parts requiring beveling according to the X, U or V bevel pattern, independent of their thickness, it being unnecessary to know the chemical composition of the material or materials to be welded, such as in the case of unlike parts like bi-metals.

The welding of a part is started (7), after being duly beveled, using an austenitic and ferritic weld deposit crystallization type electrode, as follows:

In the $1^{st}$ layer (1), both sides of the bevel are covered, including its root, using electrodes with adequate weld crystallization to obtain the austenitic plus ferritic type structure, tacking the parts to join them with the same electrode.

In the $2^{nd}$ layer (2), an electrode with the adequate crystallization for the obtainment of the pearlitic or pearlitic plus troostitic texture is used. In the $3^{rd}$ layer (3), the electrode with the adequate weld crystallization is deposited for the obtainment of the austenitic type texture, and in the $4^{th}$ layer (4), an electrode with the adequate weld crystallization is deposited for obtainment of the sorbitic plus bainitic type texture.

In the $5^{th}$ layer (5), an adequate crystallization welding electrode is used for the obtainment of the texture of the austenitic plus ferritic type, and in the $6^{th}$ layer (6), an adequate crystallization electrode for the obtainment of the bianitic type is used.

If the part being welded is thicker than 25 millimeters, the $1^{st}$ layer (1) is again applied with the deposited weld crystallization for the obtainment of the austenitic plus ferritic texture and, followed by the $2^{nd}$, $3^{rd}$, $4^{th}$, $5^{th}$ and $6^{th}$ layers (2, 3, 4, 5, 6) with the respective texture characteristics described above, until completing the filling of the bevel, it not being necessary to apply all 6 layers (1, 2, 3, 4, 5, 6) for the entire filling of the bevel, but it is essential to observe the order of application of the layers, as indicated above. The length of each weld bead should be approximately 10 cm of applied weld, as in an intermingled fashion, instead of continuous beads.

Summarizing, the purpose of the $1^{st}$ layer (1) is to cover the bevel and its root with the electrode of the deposited weld crystallization; which should be adequate for the obtainment of an austenitic plus ferretic texture. With the $2^{nd}$ layer (2), we proceed to fitting the bevel with the deposited weld crystallization, obtaining a pearalitic or pearalitic plus troostitic texture while, in the $3^{rd}$ and $5^{th}$ layers (3, 5), an electrode of deposited weld crystallization for the obtainment of an austenitic plus ferritic texture. In the $4^{th}$ layer (4), an electrode of deposited weld crystallization for the obtainment of a sorbitic plus bianitic texture is used, and in the $6^{th}$ layer (6), an electrode of deposited weld crystallization for the obtainment of the bainitic texture is used.

There being the necessity for more layers, successive layers are applied in the quantity necessary to fill in the bevel or in the desired volume, not necessarily corresponding to the volume of the bevel, and the layers applied do not necessarily have to have all of the 6 layers described above but need to obey the order of application established in the present invention.

After application of all the desired layers, then, when necessary, the milling of the piece may proceed for the recovery of its original dimensions, without the need of thermal treatment of the weld for the milling procedure.

The temperature of the part is limited to 100° C. using the procedure described, that is, intermingled welding, each bead having a length of more or less 10 cm, with the narrowest width possible.

Notwithstanding the present invention being illustrated in accordance with a concretization currently preferred, it is understood that this in no way limits the invention, since the alterations and modifications will be immediately evident to the experts, in light of the present exposition. For this reason, the invention shall be limited exclusively by the scope of the following claims.

The invention claimed is:

1. An electric welding process for high and low alloy, hardenable, hardened and bi-metals steel, for obtaining specific textures, the process comprising the steps of:
(A) preparing a work piece with a root, having a first side and a second side, to be welded by producing chamfers of a shape selected for the group consisting of: X-shape, U-shape and V-shape; the shape of the chamfer depending on the thickness of the work piece and on the area to be welded, and
(B) welding the chamfered work piece using electrodes of specific chemical characteristics, enabling the welding of the high and low alloy, hardenable, hardened and bi-metals steel; the welding comprising the steps of:
(i) in a first layer, coating the first side and the second side of the chamfer and the root with an adequate weld crystallization electrode deposited for obtaining an austenite and ferrite texture, with microstructures/crystallizations doting all parts fixing them with the same electrode;
(ii) in a second layer, using an adequate type of welding electrode deposited for obtaining a pearlite or a pearlite plus troostite texture;
(iii) in a third layer, using an adequate type of welding electrode deposited for obtaining an austenite texture, corresponding to only one characteristic of the texture of the first layer;
(iv) in a fourth layer, using an adequate type of welding electrode deposited for obtaining a sorbite plus bainite texture;
(v) in a fifth layer, using an adequate type of welding electrode deposited for obtaining an austenite plus ferrite texture, corresponding to the repetition of the structure of the first layer, and
(vi) in a sixth layer, using an adequate type of welding electrode deposited for obtaining a bainite texture,
wherein when only one side of the work piece is welded, the chamfer is of a shape selected for the group consisting of: V-shape and U-shape; and when both sides are welded, the chamfer is of a X-shape, creating the V-shape on both sides, giving the X-shape chamfer aspect, and
wherein electrodes of specific chemical characteristics are used to obtain specific textures matching desired microstructures/crystallizations for each layer when the weld is deposited on a base portion material of the work piece, allowing the welding of high and low alloys, hardenable or hardened steels, and
wherein the types of electrodes depending on the types of microstructures/crystallizations of the weld intended to be produced, and
wherein when starting with a deposit of austenite and ferrite to the layers said microstructure/crystallization produced in each layer will present a weld stronger than the material of the base portion of the work piece, and
wherein choosing the correct electrodes types for the purpose of the work piece to be welded, and
wherein when using the work piece for static or dynamic efforts, choosing the correct electrodes types for the purpose and group type of the work piece to be welded.

2. The electric welding process for high and low alloy, hardenable, hardened and bi-metals steel, according to claim 1, wherein when the welded work piece has a thickness greater than 25 millimeters, the process further comprising a step (C) for welding the chamfered work piece by repeating the steps (i) to (vi) with their corresponding textures, until the chamfer filling is completed, the last layer to be deposited being any of the layers from steps (i) to (vi), not requiring the re-application of all six layers (i) to (vi).

3. The electric welding process for high and low alloy, hardenable, hardened and bi-metals steel according to claim 1 or 2 wherein the welding layer is composed of welding fillets.

4. The electric welding process for high and low alloy, hardenable, hardened and bi-metals steel according to claim 3, wherein when the electrodes are melted the deposited welding fillets are created, the deposited welding fillets of a length of about 10 cm.

5. The electric welding process for high and low alloy, hardenable, hardened and bi-metals steel according to claim 3, wherein the deposited welding fillets are applied in an intercalated manner, wherein while depositing the welding fillets to compose a deposited welding layer, the fillets are intercalated with an empty space of a length of about 10 cm between them, in such way that the empty space is filled by other welding fillets of a length of about 10 cm after the first fillets were deposited, until the layer deposit is completed.

6. The electric welding process for high and low alloy, hardenable, hardened and bi-metals steel, according to claim 1, wherein after applying all of the desired layers for the complete filling of the chamfer, the work piece with the layers is milled in the welded area to recover the original dimensions, without a need for a heat treatment of the deposited weld for the milled process.

7. The electric welding process for high and low alloy, hardenable, hardened and bi-metals steel, according to claim 1, wherein the temperature of the work piece is limited to a maximum temperature of 100° C. for the welding process.

* * * * *